United States Patent
Oaki et al.

(10) Patent No.: US 7,627,164 B2
(45) Date of Patent: Dec. 1, 2009

(54) PATTERN INSPECTION METHOD AND APPARATUS WITH HIGH-ACCURACY PATTERN IMAGE CORRECTION CAPABILITY

(75) Inventors: Junji Oaki, Kanagawa (JP); Nobuyuki Harabe, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 685 days.

(21) Appl. No.: 11/360,657

(22) Filed: Feb. 24, 2006

(65) Prior Publication Data

US 2007/0064994 A1 Mar. 22, 2007

(30) Foreign Application Priority Data

Sep. 22, 2005 (JP) ............................. 2005-276584

(51) Int. Cl.
*G06K 9/00* (2006.01)
(52) U.S. Cl. ....................................... 382/144; 382/149
(58) Field of Classification Search ......... 382/141–149, 382/151, 190, 209, 218, 309; 348/92, 125
See application file for complete search history.

(56) References Cited

U.S. PATENT DOCUMENTS

| 7,366,343 B2 * | 4/2008 | Takeuchi ..................... 382/145 |
| 7,444,616 B2 * | 10/2008 | Sandstrom et al. ............. 716/21 |
| 2004/0015464 A1 * | 1/2004 | Ii et al. ......................... 706/48 |
| 2006/0018530 A1 | 1/2006 | Oaki et al. |

FOREIGN PATENT DOCUMENTS

| JP | 08-076359 | 3/1996 |
| JP | 10-096613 | 4/1998 |
| JP | 11-153550 | 6/1999 |
| JP | 2000-105832 | 4/2000 |
| JP | 2000-241136 | 9/2000 |
| JP | 2006-030518 | 2/2006 |

OTHER PUBLICATIONS

U.S. Appl. No. 11/386,744, filed Mar. 23, 2006, Sugihara, et al.
U.S. Appl. No. 11/567,550, filed Dec. 6, 2006, Oaki.
U.S. Appl. No. 11/567,520, filed Dec. 6, 2006, Oaki.
Japanese office-action for application No. 2006/227348, Aug. 25, 2009.

* cited by examiner

*Primary Examiner*—Daniel G Mariam
(74) *Attorney, Agent, or Firm*—Oblon, Spivak, McClellland, Maier & Neustadt, L.L.P.

(57) ABSTRACT

A high-accuracy image correction device adaptable for use in pattern inspection apparatus is disclosed. The device includes a correction region designation unit which designates a correction region including a pattern and its nearby portion within each of an inspection reference pattern image and a pattern image under test. The device also includes an equation generator which generates by linear predictive modeling a set of simultaneous equations for a reference pattern image within the correction region and an under-test pattern image within the correction region, a parameter generator for solving the equations to obtain more than one model parameter, and a corrected pattern image generator for using the model parameter to apply the linear predictive modeling to the reference pattern image to thereby generate a corrected pattern image. A pattern inspection method using the image correction technique is also disclosed.

8 Claims, 8 Drawing Sheets ial image degradation or "corruption." Another problem faced with the prior art lies in difficulties in setting appropriate values for a great number of parameters required for respective corrections and also in setup of an adequate execution order of such correction processes.

PATTERN INSPECTION METHOD AND APPARATUS WITH HIGH-ACCURACY PATTERN IMAGE CORRECTION CAPABILITY

CROSS-REFERENCE TO RELATED APPLICATION

This application is based upon and claims the benefit of priority from prior Japanese Patent Application No. 2005-276584, filed on Sep. 22, 2005 in Japan, the entire contents of which are incorporated herein by reference.

BACKGROUND OF THE INVENTION

1. Field of the Invention

The present invention relates generally to image correction technologies and, more particularly, to a method and apparatus for inspecting pattern images for defects, including ultrafine circuit patterns of reticles for use in the manufacture of large-scale integrated (LSI) semiconductor devices and/or low-profile flat panel display devices, such as liquid crystal display (LCD) panels.

2. Description of Related Art

Usually, LSI chip fabrication comes with cost penalties, so it is inevitable to improve production yields. One of yield reduction factors must be the presence of pattern defects of a reticle used for photolithographically transferring or "imaging" an ultrafine circuit pattern onto semiconductor wafers. In recent years, as LSI chips decrease in feature sizes, pattern defects to be detected decrease in minimum size. This in turn requires a further increase in accuracy of a pattern inspection apparatus for inspecting a reticle for defects.

Currently established pattern defect inspection methodology is generically classified into two approaches, one of which employs die-to-die (DD) comparison techniques, and the other of which uses due-to-database (DB) comparison schemes. The DD comparison is a method for detecting defects through comparison between those images of two square regions or "dies" on a reticle while regarding one of them as an inspection reference pattern image and letting the other be a pattern image under testing. The DB comparison is a method of detecting defects by comparing the sensor data of a die to design data as created from computer-aided design (CAD) data for the LSI design use.

With the quest for further miniaturization of on-reticle circuit patterns, a need is felt to attain the ability to detect extra-fine defects, which are small enough to be buried in a positional offset between picture elements or "pixels" of to-be-compared images, image expansion/shrink, swell, and sensing noises. In the DD or DB comparison also, it becomes very important to accurately perform alignment and image correction in units of sub-pixels, which are typically done prior to the pattern inspection by comparison of the reference pattern image and under-test pattern image.

A known approach to meeting this need is to employ a pre-finishing process prior to execution of the "main" inspection by comparison of a couple of images—i.e., the inspection reference pattern image and the test pattern image. This process includes the steps of performing bicubic interpolation-based alignment in units of subpixels and thereafter sequentially performing image expansion/shrink correction, image swell correction, resize correction, noise averaging processing and others. An example of the image expand/shrink correction is disclosed in JP-A-2000-241136. Unfortunately, mere repeated execution of these corrections would result in occurrence of accumulated errors, which can cause appre-

BRIEF SUMMARY OF THE INVENTION

It is therefore an object of this invention to provide a technique for accurately correcting or "amending" the image of a workpiece under inspection.

Alternative object of the invention is to provide an approach to accurately inspecting the image of a workpiece being tested.

A currently preferred form of the invention is the one that integrally combines together alignment and image correction techniques. Its one principal feature lies in effective image correction using input/output predictive modeling which is less in image degradation or "corruption" and also less in number of setup parameters. This image correction is typically for realizing the alignment and the image correction in units of subordinate pixels or "sub-pixels" by using a two-dimensional (2D) input/output predictive modeling scheme while letting an inspection reference pattern image be used as input data and also letting an under-test pattern image be output data, by way of example. In this case, the image data is used to create a relational expression of a matrix; then, solve a set of simultaneous equations to thereby identify more than one model parameter. Next, based on the identified 2D linear predictive model, a correction image is created.

Usually in the pattern image inspection, there is no guarantee that every pixel region involved is always inspectable at high levels of sensitivity. Consequently, in processes of generating a corrected image based on the 2D linear predictive modeling, it would be preferable to provide an arrangement capable of focusing on selected pixel regions, which are required to undergo high sensitive inspection.

A currently preferred form of the invention as disclosed and claimed herein is aimed at provision of an image correction method capable of offering highly accurate inspection capabilities for an inspection-executed region and its nearby areas while excluding influences of inspection-unnecessary regions within a pattern image during execution of image correction in a pattern inspection apparatus, such as reticle inspection equipment.

In accordance with a first aspect of this invention, an image correction device is provided, which is for correcting a pattern image by use of an inspection reference pattern image of a workpiece being tested and a pattern image under test. The device includes a correction region designation unit operable to designate a correction region including a pattern and its nearby portion within each of the reference pattern image and the pattern image under test, an equation generation unit for generating by linear predictive modeling a set of simultaneous equations for a reference pattern image within the correction region and an under-test pattern image within the correction region, a parameter generation unit for solving the equations to thereby obtain more than one model parameter, and a corrected pattern image generation unit for using the model parameter to apply the linear predictive modeling to the reference pattern image to thereby generate a corrected pattern image.

In accordance with a second aspect of the invention, a pattern inspection apparatus is provided, which performs pattern inspection by using an inspection reference pattern image of a workpiece being tested and a pattern image under test. The apparatus includes a correction region designation unit operative to designate a correction region including a pattern and its nearby portion within each of the reference pattern image and the pattern image under test, an equation generation unit for generating by linear predictive modeling a set of simultaneous equations for a reference pattern image within the correction region and an under-test pattern image within the correction region, a parameter generation unit for solving the equations to thereby obtain more than one model parameter, a corrected pattern image generation unit for using the model parameter to apply the linear predictive modeling to the reference pattern image to thereby generate a corrected pattern image, and a pattern image comparison unit for comparing the corrected pattern image to the test pattern image in the correction region.

In accordance with a third aspect of the invention, an image correction method for correcting a pattern image by use of an inspection reference pattern image of a workpiece being tested and a pattern image under test is provided. This method includes the steps of designating a correction region including a pattern and its nearby portion within each of the reference pattern image and the pattern image under test, generating by linear predictive modeling a set of simultaneous equations for a reference pattern image within the correction region and an under-test pattern image within the correction region, solving the equations to thereby obtain more than one model parameter, and using the model parameter to apply the linear predictive modeling to the reference pattern image to thereby generate a corrected pattern image.

In accordance with a fourth aspect of the invention, a pattern inspection method for performing pattern inspection by using an inspection reference pattern image of a workpiece being tested and a pattern image under test is provided. The inspection method includes designating a correction region including a pattern and its nearby portion within each of the reference pattern image and the pattern image under test, generating by linear predictive modeling a set of simultaneous equations for a reference pattern image within the correction region and an under-test pattern image within the correction region, solving the equations to thereby obtain more than one model parameter, using the model parameter to apply the linear predictive modeling to the reference pattern image to thereby generate a corrected pattern image, and comparing the corrected pattern image to the test pattern image in the correction region.

DETAILED DESCRIPTION OF THE INVENTION

An image correction technique and a pattern inspection procedure in accordance with currently preferred embodiments of this invention will now be explained with reference to the accompanying drawings below.

(Image Correction Device)

An image correction device embodying the invention is for correction or "amendment" of a pattern image as drawn on a workpiece being tested. The image corrector device uses an inspection reference pattern image of a workpiece under test and a sensed pattern image of the under-test workpiece to generate a correction pattern image. This pattern image is a corrected or "amended" version of the inspection reference pattern image or the test pattern image. Although the description below assumes that the test workpiece is a reticle for example, the workpiece may alternatively be any other pattern image-formed objects for use in the manufacture of semiconductor devices or LCD panels, including but not limited to photomasks and wafers. The reference pattern image and the test pattern image are the ones that are compared together. In case there are two pattern images to be compared, no differences occur if the reference pattern image and the test pattern image are named vice versa. The reference pattern image and test pattern image are for use as objects to be compared by the DD or DB comparison scheme.

(Pattern Inspection Apparatus)

A pattern inspection apparatus embodying the invention is the one that inspects for defects a pattern image as drawn on a workpiece being tested. This inspection apparatus includes the image correction device, for comparing a pattern image under test to a corrected pattern image as generated at the image corrector device to thereby inspect the pattern image for defects. For instance, the inspection apparatus is equipped with an illumination unit which emits illumination light onto a workpiece under testing, an image acquisition unit for detecting reflected light or transmission light from the under-test workpiece to thereby acquire a pattern image thereof, a reference data generator circuit for generating from CAD data design data resembling the graphics data of a reticle, and a comparison processing unit for comparing between the pattern images.

Figure 2:
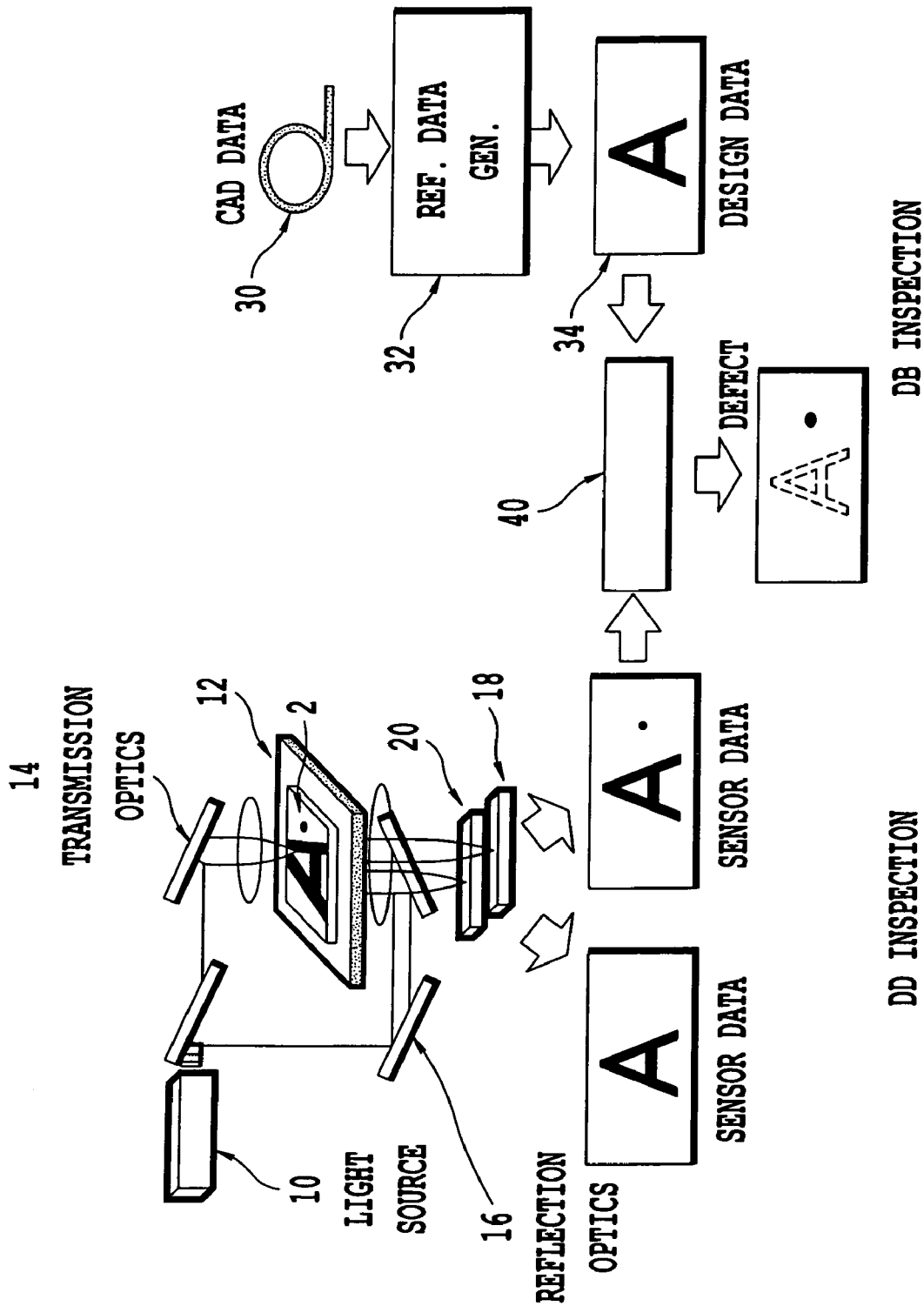
FIG. 2 depicts an exemplary configuration of a pattern inspection apparatus also embodying the invention.

See FIG. 2, which shows an exemplary arrangement of the pattern inspection apparatus. The illumination unit of this inspection apparatus includes a light source 10 for producing and emitting coherent light. The image acquisition unit includes a stage structure 12 which stably supports a reticle 2 as mounted thereon, a stage driver (not shown) for driving the stage 2, a transmission light optical system 14 which guides the light from the light source 12 to pass through the reticle 2 mounted on stage 12, a reflected light optics 16 capable of detecting its reflection light, an optical sensor module 18 for detecting light components that have passed through the optics 14, and a reflected light sensor 20 for sensing the reflected light from the reflection light optics 16. With such an arrangement, the pattern inspection apparatus is operable to acquire the sensor data (i.e., optical image) of the pattern image drawn on the reticle. The transmission optics 14 and reflection optics 16 are each made up of a half mirror and a convex lens assembly, for example. The pattern inspection apparatus includes at least one of the transmission optics 14 and reflection optics 16. The inspection apparatus includes at least one of the transmission light sensor 18 and the reflected light sensor 20. The inspection apparatus also includes a reference data generation circuit 32 which creates design data (i.e., reference image) based on CAD data 30 for the LSI design use. The apparatus further includes a comparison processing unit 40. With this arrangement, the inspection apparatus is capable of detecting pattern defects, if any, by either comparing sensor data sets together or comparing a sensor data set to the design data.

Figure 3:
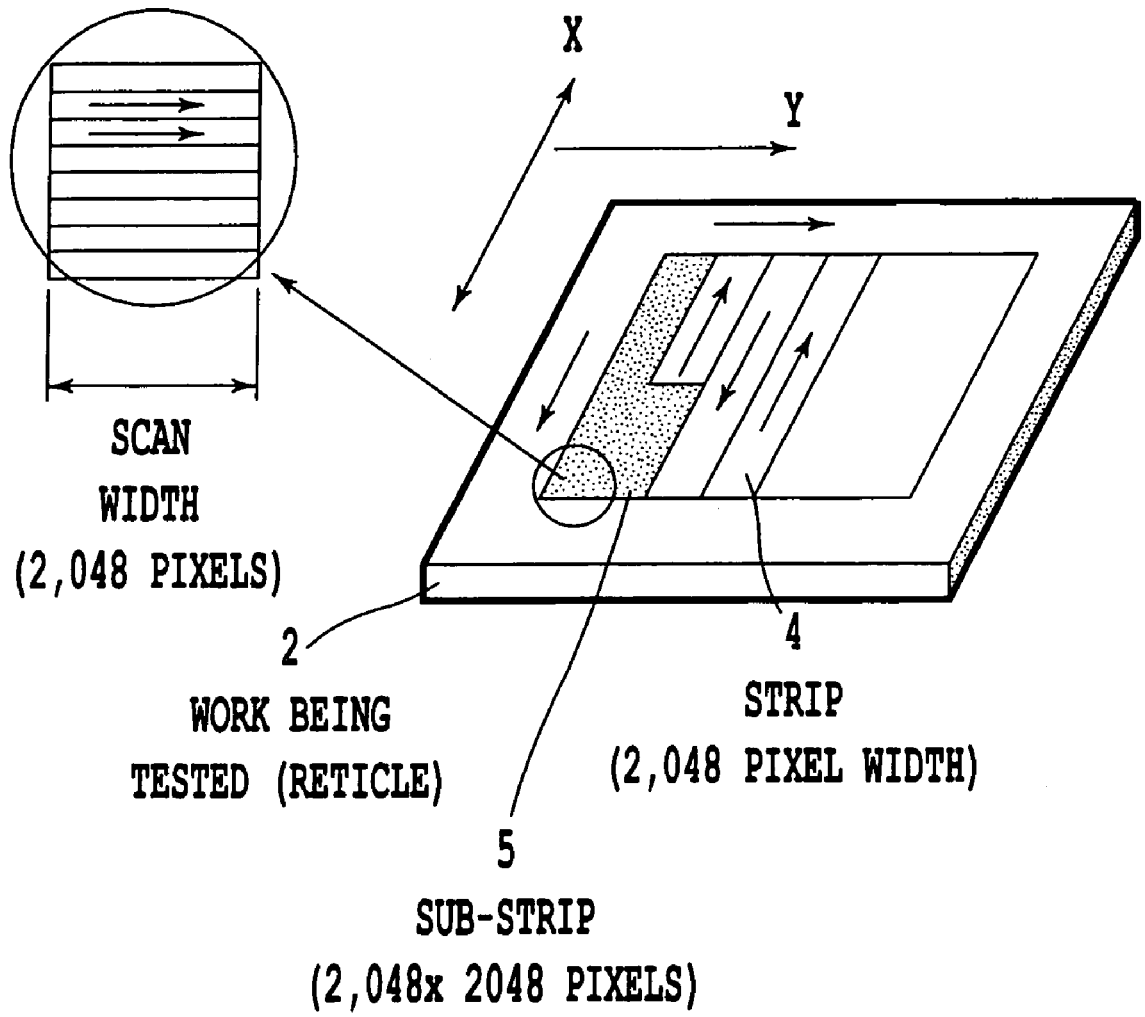
FIG. 3 is a perspective view of a reticle which is subject to image acquisition by the mask scanning of a line sensor.

A method of acquiring the pattern image drawn on the reticle 2 will be set forth with reference to FIG. 3. Firstly, let the reticle 2 be scanned by a line sensor having a linear array of photodiodes (PDs). Here, for purposes of convenience in description, a unitary narrow elongate portion 4 as cut out of the reticle surface area of interest in the X-axis direction (in a direction parallel to one side edge of reticle 2) will be called a one strip. This strip is further cut into fine square portions or "dies" in the Y-axis direction (in the direction perpendicular to the X-axis direction). A sensed image 5 of such die portion will be called one "sub-strip." The one sub-strip is arranged for example to have a matrix of 2,048 rows and 2,048 columns of picture elements or "pixels." The inspection that determines whether defects are present or absent is performed in units of substrips, by way of example. Additionally one pixel has 256 levels of grayscale.

The inspection apparatus performs a pattern inspection operation by comparing pattern images together as shown in FIG. 2. In the case of DD comparison, at least one of the transmission light or reflection light is used to store or "record" the resulting sensor data in either the sensor 18 or the sensor 20. Then, sensor data sets of two dies on the reticle 2 are compared together by the comparison processor unit 40 for detection of defects, if any. Alternatively in the case of the DB comparison, there are used the sensor data of one die on reticle 2 as recorded in the sensor 18 or 20 by using at least one of the transmission light and reflected light and the design data 34 created by the reference data generator circuit 32 based on the LSI design-use CAD data 30. Next in the DB comparison, the sensor data and design data 34 are compared together by the comparison processor 40 to thereby defect defects. Note here that the pattern inspection apparatus may be configured from electronic circuitry, software programs, personal computer (PC), or any possible combinations thereof.

(Comparison Processing Unit)

Figure 4:
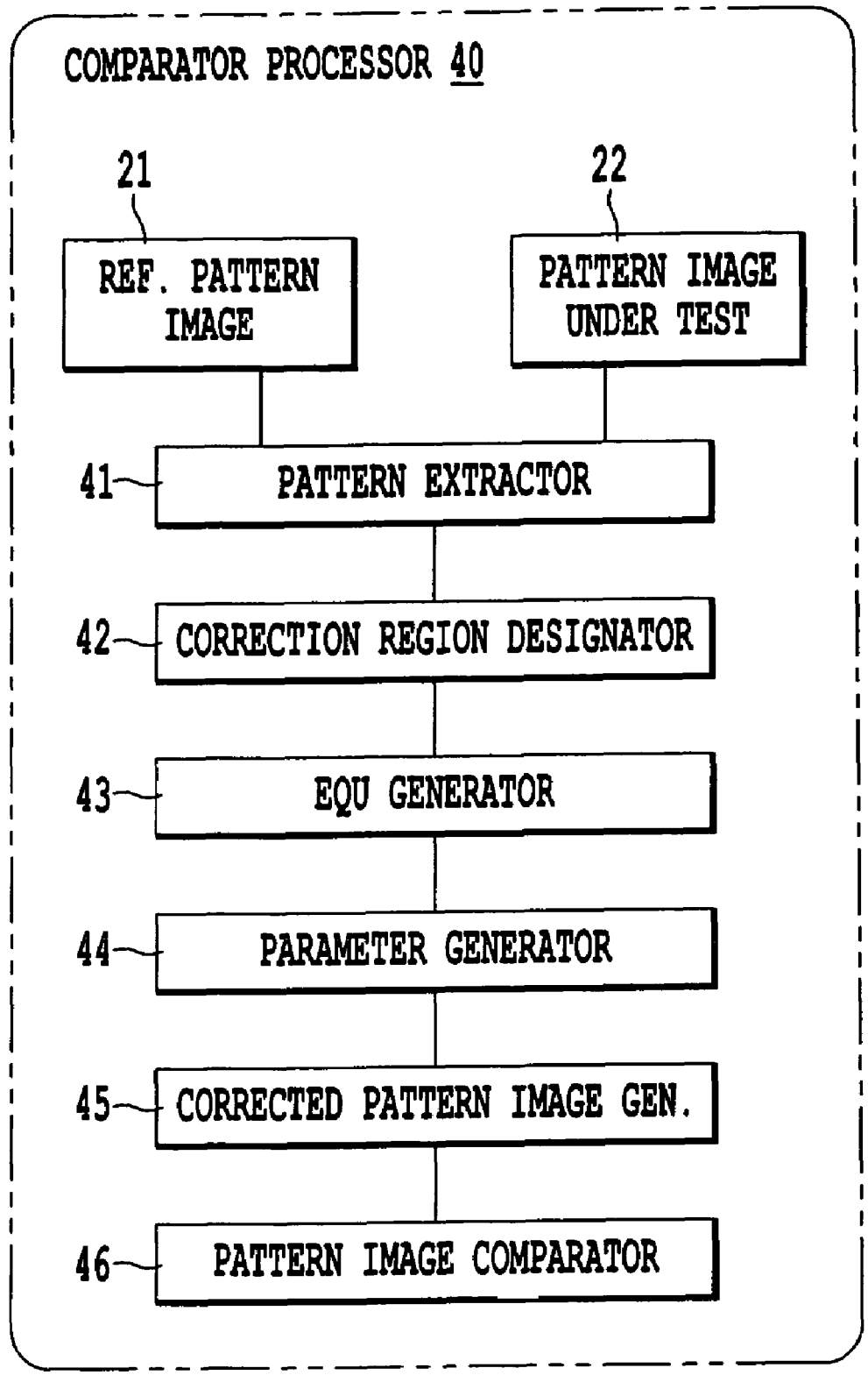
FIG. 4 depicts an internal configuration of a comparison processing unit in the inspection apparatus of FIG. 2.

A configuration of the comparison processing unit 40 is shown in FIG. 4. The comparison processor unit 40 is for comparing together an inspection reference pattern image 21 and a pattern image 22 under test. The comparison processor 40 includes a pattern extraction unit 41, correction region designating unit 42, equation generation unit 43, parameter generation unit 44, corrected pattern image generation unit 45, and pattern image comparison unit 46. The pattern extractor 41 is operable to extract, from the reference pattern image 21 and under-test pattern image 22, certain patterns as objects to be corrected or "amended." These extracted patterns are also the objects to be pattern-inspected. Preferably, the extracted patterns may be high-accuracy comparison-required ones, such as contact holes or else. The correction region designator 42 is to designate as a correction region a nearby or peripheral area which contains the extracted pattern.

The equation generator unit 43 is operative to generate by linear predictive modeling a set of simultaneous equations for an inspection reference pattern image residing in the extracted correction region and an under-test pattern image within the correction region. The parameter generator 44 is for resolving the simultaneous equations to thereby obtain more than one model parameter. The corrected pattern image generator 45 corrects or modifies by using the model parameter(s) the pattern image of the correction region and then generates a corrected pattern image. The pattern image comparator 46 compares the under-test pattern image in the correction region to the corrected pattern image to thereby perform pattern inspection.

The comparator processor 40 also includes a data storage device, such as a semiconductor memory, which has several memory spaces including, for example, a pattern extraction-use storage area, correction region designation-use storage area, equation storing area, parameter storage area, corrected pattern image storage area, and comparison result storage area. Comparison processor 40 arithmetically processes the data items stored in these storage areas in accordance with the computation routines of an arithmetic processor device and then stores a solution method and processing results, such as image comparison results, in respective corresponding storage areas (not shown). An image correction device as used herein is similar in configuration to the pattern inspection apparatus with the pattern image comparator 46 being excluded from the latter.

(Pattern Inspection Method)

Figure 5:
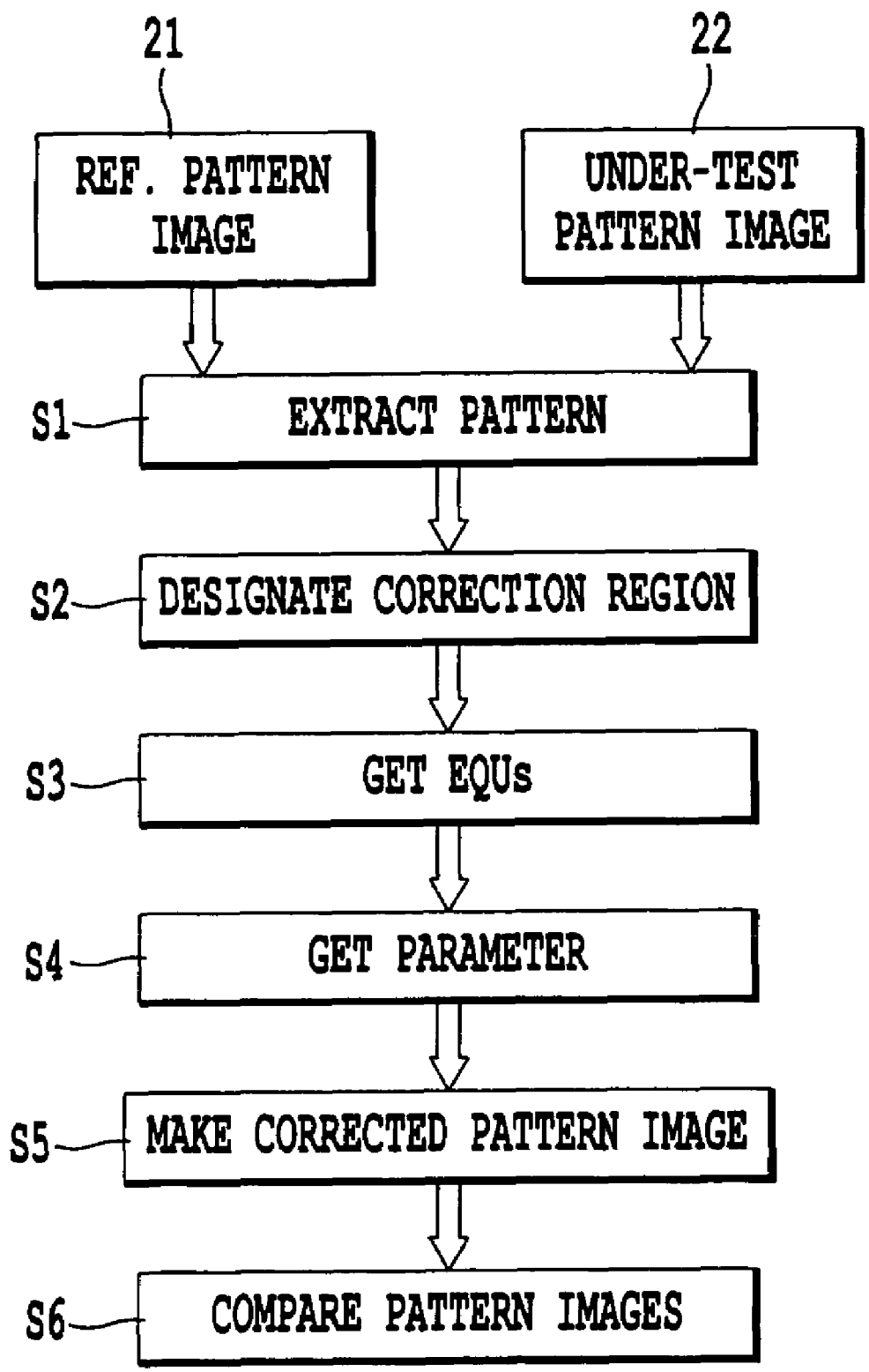
FIG. 5 is a flow diagram of a procedure of a pattern inspection method embodying the invention.

See FIG. 5, which is a flow diagram showing major process steps of a pattern inspection method embodying the invention. This method is to inspect a pattern image for defects by using the corrected pattern image as obtained by the image correction method stated supra. The method starts with a pattern extraction step S1, which extracts certain pattern elements for use as objects to be corrected from the inspection reference pattern image 21 and under-test pattern image 22 to provide extracted patterns and then stores data items indicative of the position coordinates of these extracted patterns in the pattern extraction-use storage area of the memory. Then, the procedure goes to a correction region designation step S2, which designates a nearby region containing therein the extracted pattern as a correction region and then stores the position coordinate data of such region in the correction region designation-use storage area of the memory. Next, proceed to an equation generation step S3, which generates by linear predictive modeling a set of simultaneous equations with respect to those portions of the reference pattern image and under-test pattern image within the corrected regions and then stores these equations in the equation storage area of the memory. At a parameter generation step S4, resolve the simultaneous equations by the arithmetic processing routine to thereby obtain more than one model parameter, and then store it in the parameter storage area. In a corrected pattern image generation step S5, perform correction of the pattern image of the correction region by use of the model parameter(s), thereby creating a corrected pattern image, which is then stored in the corrected pattern image storing area of the memory. At a pattern image comparison step S6, compare the under-test pattern image in the correction region to the corrected pattern image by the arithmetic processing routine to thereby perform pattern inspection; then, store results in the comparison result storage area. With the procedure above, it is possible to effectively perform image correction also for high-accuracy pattern image components of the workpiece being tested.

This pattern inspection method is realizable based on a software program to be installed in currently available digital computers for execution thereby. This program has the process steps of the pattern inspection method stated supra.

Workpieces such as reticles are adequately pattern-inspectable for defects by any one of the hardware- or software-based approaches. Additionally, an image correction method is similar in arrangement to the above-stated pattern inspection method with the pattern image comparison step S11 being eliminated therefrom.

(Equation Generation Unit and Step)

Figure 1A:
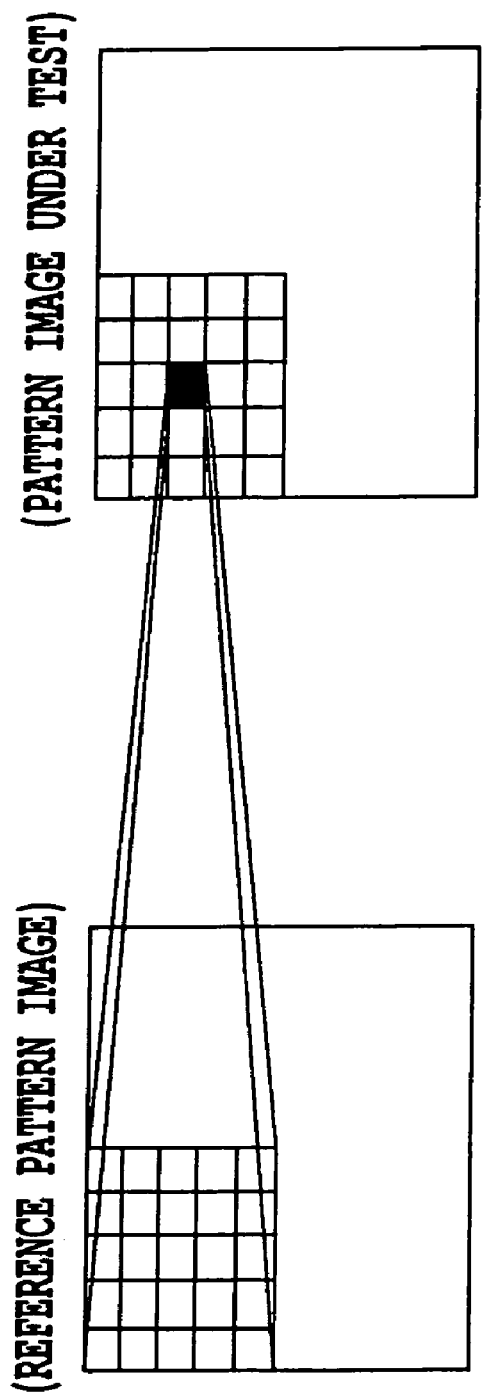
FIGS. 1A and 1B are diagrams showing a pattern image being tested and an inspection reference pattern image for explanation of a two-dimensional (2D) predictive modeling scheme for use in a pattern image inspection method embodying the invention.
Figure 1B:
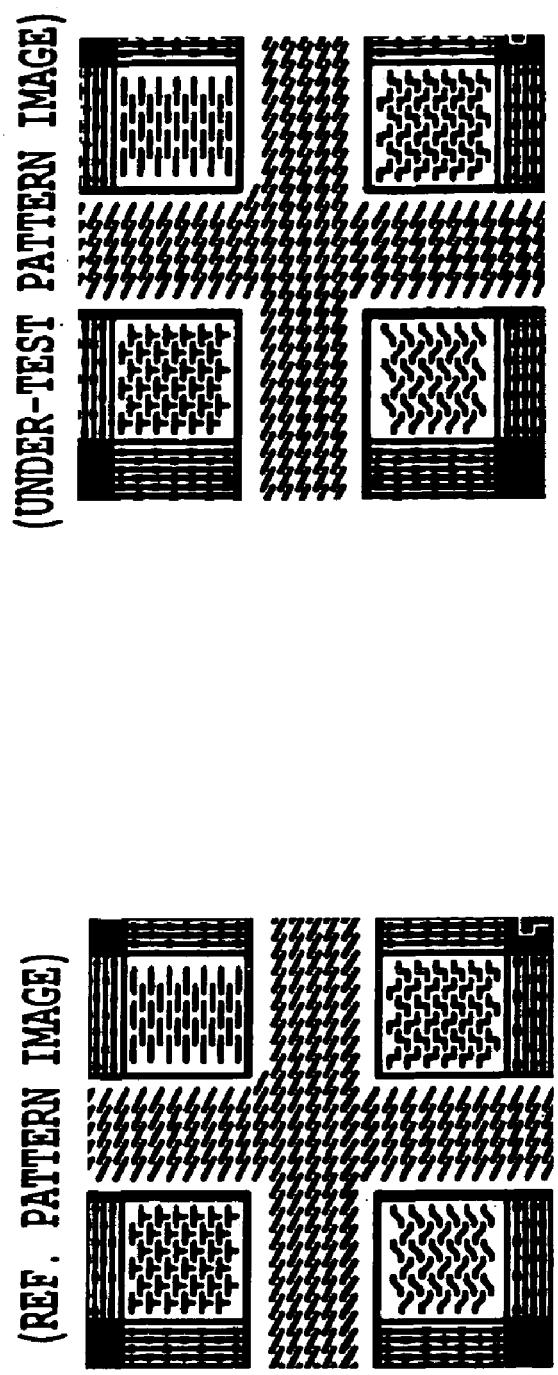

Referring to FIGS. 1A-1B, examples of the inspection reference pattern image and under-test pattern image are shown for explanation of the linear predictive modeling by use of the relationship therebetween. The above-noted image correction device uses a linear predictive modeling technique to correct the pattern image of interest at the comparison processor unit 40. The image correction device is the one that breaks through the limit of direct comparison methods. More specifically, as shown in FIG. 1B, the relation between the reference pattern image and test pattern image is online identified during inspection by use of linear predictive modeling—e.g., two-dimensional (2D) linear predictive modeling—to thereby establish a prediction model, which absorbs (fitting) any possible pixel position variations, expansion/shrink noises and sensing noises of the images concerned. Based on this predictive model, the corrected pattern image is created. This corrected pattern image is then compared to the test pattern image. Using a comparison result, defects of the test pattern image are detectable.

An explanation will first be given of a method for setting the 2D linear prediction model (2D input/output linear predictive model) while assuming that the inspection reference pattern image is 2D input data whereas the under-test pattern image is 2D output data. Suppose here that the 2D linear predictive model uses an area having a matrix of five rows and five columns (5×5) of pixels, for example. Suffixes used in this model, which correspond to the positions of 5×5 pixels, are indicated in Table 1 below. Note that in FIGS. 1A-1B, the reference pattern image is shown at the left-side part while the under-test pattern image is at the right-side part. Additionally the 2D linear predictive model is a linear predictive model in case the input and output data items are handled two-dimensionally.

TABLE 1

|   | 0 | 1 | 2 | 3 | 4 |
|---|---|---|---|---|---|
| 0 | i−2, j−2 | i−2, j−1 | i−2, j | i−2, j+1 | i−2, j+2 |
| 1 | i−1, j−2 | i−1, j−1 | i−1, j | i−1, j+1 | i−1, j+2 |
| 2 | i, j−2 | i, j−1 | i, j | i, j+1 | i, j+2 |
| 3 | i+1, j−2 | i+1, j−1 | i+1, j | i+1, j+1 | i+1, j+2 |
| 4 | i+2, j−2 | i+2, j−1 | i+2, j | i+2, j+1 | i+2, j+2 |

Let the 2D input and 2D output data be u(i,j), y(i,j), respectively. While the suffixes of the pixel of interest are given as "i" and "j," determine a block of 5×5 pixels (i.e., a total of twenty five pixels) around this pixel which is centrally located in the block. Then, let the suffixes of these nearby pixels be set as shown in Table 1. Next, regarding pixel data of a certain set of 5×5 pixel area, set up a relational equation (1) presented below. Note that in this equation (1), coefficients $b_{00}$ to $b_{44}$ of each input data u(i,j) are the model parameters to be identified.

$$y_k = y(i, j) \quad (1)$$
$$= b_{00}u(i-2, j-2) + b_{01}u(i-2, j-1) +$$

-continued
$$b_{02}u(i-2, j) + b_{03}u(i-2, j+1) + b_{04}u(i-2, j+2) +$$
$$b_{10}u(i-1, j-2) + b_{11}u(i-1, j-1) +$$
$$b_{12}u(i-1, j) + b_{13}u(i-1, j+1) + b_{14}u(i-1, j+2) +$$
$$b_{20}u(i, j-2) + b_{21}u(i, j-1) + b_{22}u(i, j) + b_{23}u(i, j+1)$$
$$+ b_{24}u(i, j+2)$$
$$b_{30}u(i+1, j-2) + b_{31}u(i+1, j-1) + b_{32}u(i+1, j) +$$
$$b_{33}u(i+1, j+1) + b_{34}u(i+1, j+2) +$$
$$b_{40}u(i+2, j-2) + b_{41}u(i+2, j-1) + b_{42}u(i+2, j) +$$
$$b_{43}u(i+2, j+1) + b_{44}u(i+2, j+2) + \varepsilon(i, j)$$

The meaning of Equation (1) is that the under-test pattern image's one pixel data $y_k$=y(i,j) is representable by the linear coupling of data items of 5×5 pixels around its corresponding pixel in the inspection reference pattern image (see FIG. 1A). Note here that the residual difference ε in Equation (1) is not evident in its statistical nature, and a parameter identification result obtained by a minimum squaring method to be later described will possibly have a bias. However, this rarely causes any serious deterrent in practical implementation. This can be said because the heart of this embodiment lies in the input/output data fitting using Equation (1) per se, and thus the parameter value of the residual difference ε is out of direct use.

(Solving Simultaneous Equations)

The simultaneous equations are solved by the parameter generator unit 44 shown in FIG. 4 at step S4 of FIG. 5. A method of solving the equations is as follows. When vectorially representing Equation (1), Equation (2) is obtained. Here, an unknown parameter vector α is given as $\alpha=[b_{00}, b_{01}, \ldots, b_{44}]^T$, and data vector $x_k$ is represented by $x_k=[u(i-2,j-2), u(i-2,j-1), \ldots, u(i+2,j+2)]^T$.

$$x_k^T \alpha = y_k \quad (2)$$

The model parameter identification is achievable in a way which follows: scan the coordinates i, j of the inspection reference pattern image and under-test pattern image to acquire data of pixels at the coordinates (i,j); then, combine together 25 sets of data into an equation system. Practically, from a statistical viewpoint, prepare n (n>25) sets of data as in Equation (3). Then, solve twenty five-dimensional set of equations based on the minimum squaring method as will be set forth later, thereby identifying the value of α. Here, $A=[x_1, x_2, \ldots, x_n]^T$, $y=[y_1, y_2, \ldots, y_n]^T$, and $x_k^T \alpha = y_k$, where k=1, 2, . . . , n (n is an integer). These equations are solvable by the minimum squaring method or any other available methods, such as a maximum likelihood estimation method.

$$\begin{bmatrix} x_1^T \\ \vdots \\ x_n^T \end{bmatrix} \alpha = \begin{bmatrix} y_1 \\ \vdots \\ y_n \end{bmatrix} \Rightarrow A\alpha = y \Rightarrow \alpha = (A^T A)^{-1} A^T y \quad (3)$$

Assume that the inspection reference pattern image and the under-test pattern image are each a block of 512×512 pixels as an example. In this case, scanning the model of a 5×5 pixel region results in a decrease of two pixels at every side edge of the image of interest. Thus, the resultant equation number is given by Equation (4), which suggests that 258,064 sets of data are obtainable. This number is deemed sufficient in a statistical viewpoint.

$$n=(512-4)\times(512-4)=258064 \quad (4)$$

(Corrected Pattern Image Generation Unit and Step)

The parameter $\alpha$ thus identified and the input/output image data used for the identification are then substituted into Equation (1). Then, perform simulation processing for scanning the pixel coordinates i, j to thereby generate a corrected pattern image. This image is such that the minimum square method-based fitting results in decreases in pixel position deviation of less than one pixel, expansion/shrink, swell noises, resizing processing and sensing noises. Although the data used for such simulation can contain therein defective pixels in most cases, these hardly appear in the corrected pattern image. This can be said because such defective pixels are extremely less in number than the entire data used for the identification so that these are no longer subject to the fitting in the minimum squaring method. Additionally the signal-to-noise (S/N) ratio is improved in the surrounding area, so defective pixels are emphasized. This is an additional advantage unique to the embodiment.

(Example of Two-Value Pixel Mapping)

Figure 6:
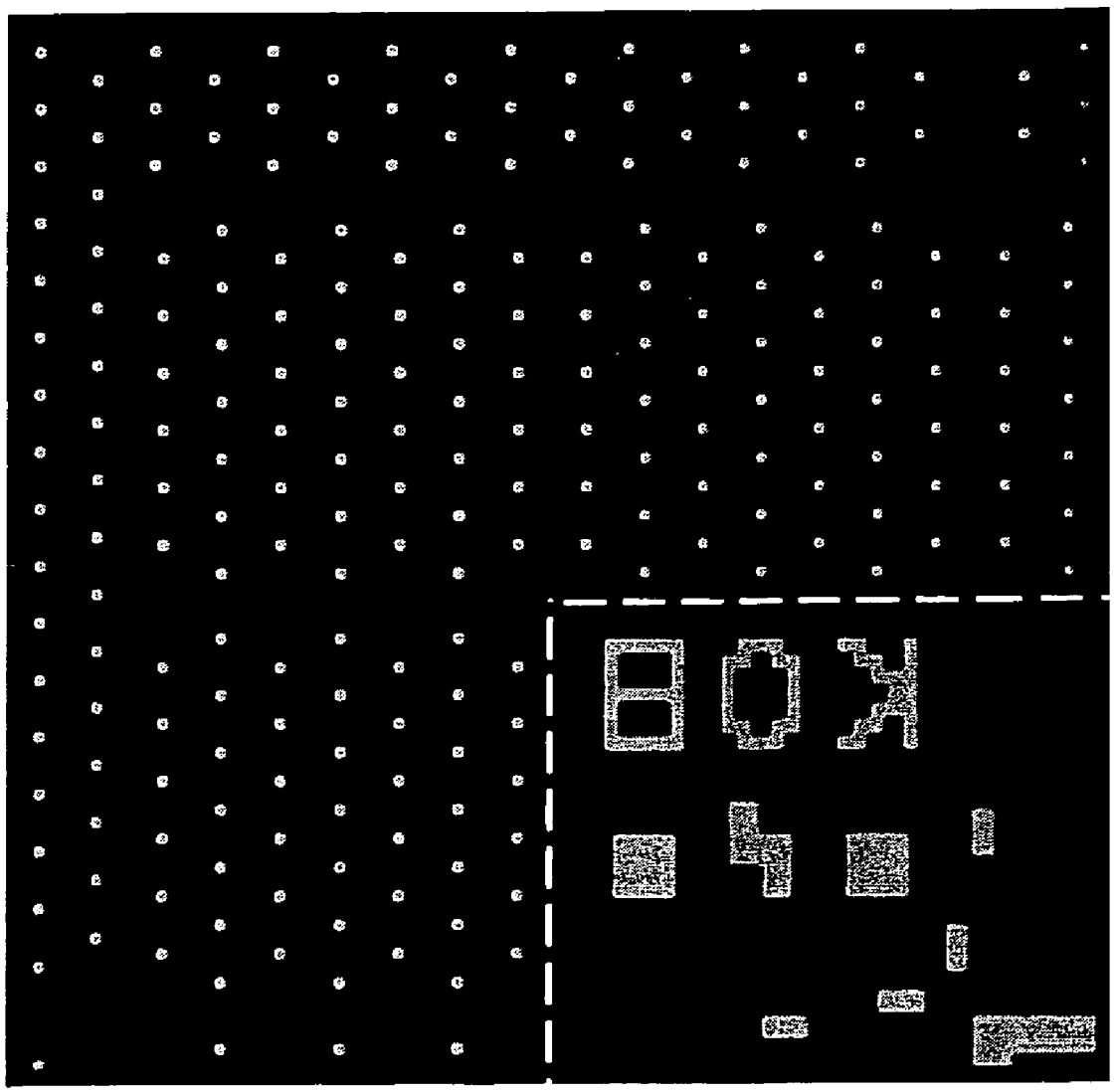
FIG. 6 is a pictorial representation of an exemplary pattern of contact holes.

An exemplary pattern image of contact holes is shown in FIG. 6. This pattern image has at its lower right corner zone indicated by broken lines character-based pattern image elements other than the contact holes, such as markers. These character pattern images need not be inspected for defects. In this case, such inspection-unnecessary zone is excluded during extraction of inspection-required patterns. This makes it possible to achieve high-sensitivity pattern inspection without having to be affected by whether these character patterns, such as markers, are formed successfully or not.

Figure 7:
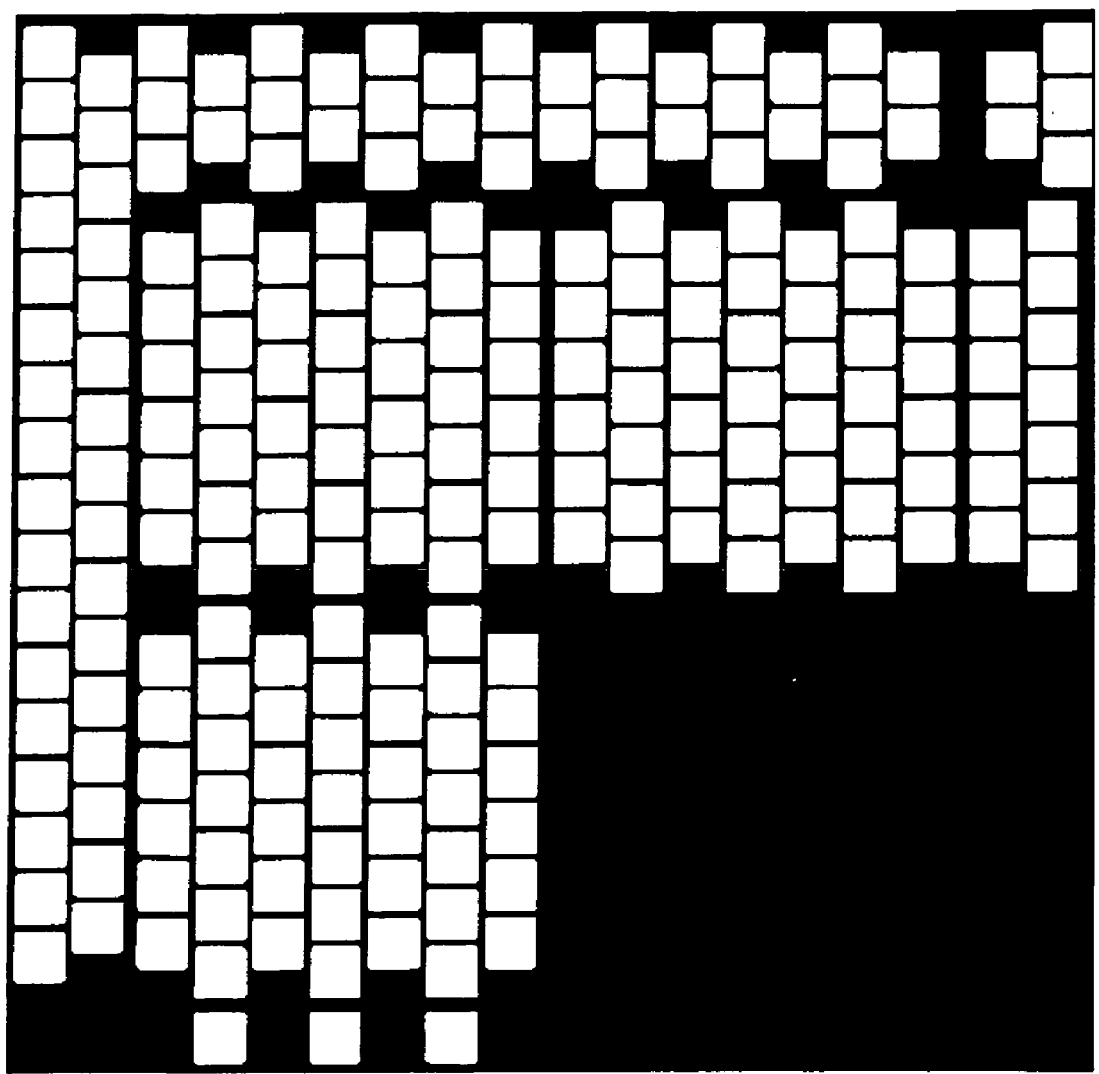
FIG. 7 shows a two-value pixel map which is obtained by extraction of the contact hole pattern.
Figure 8:
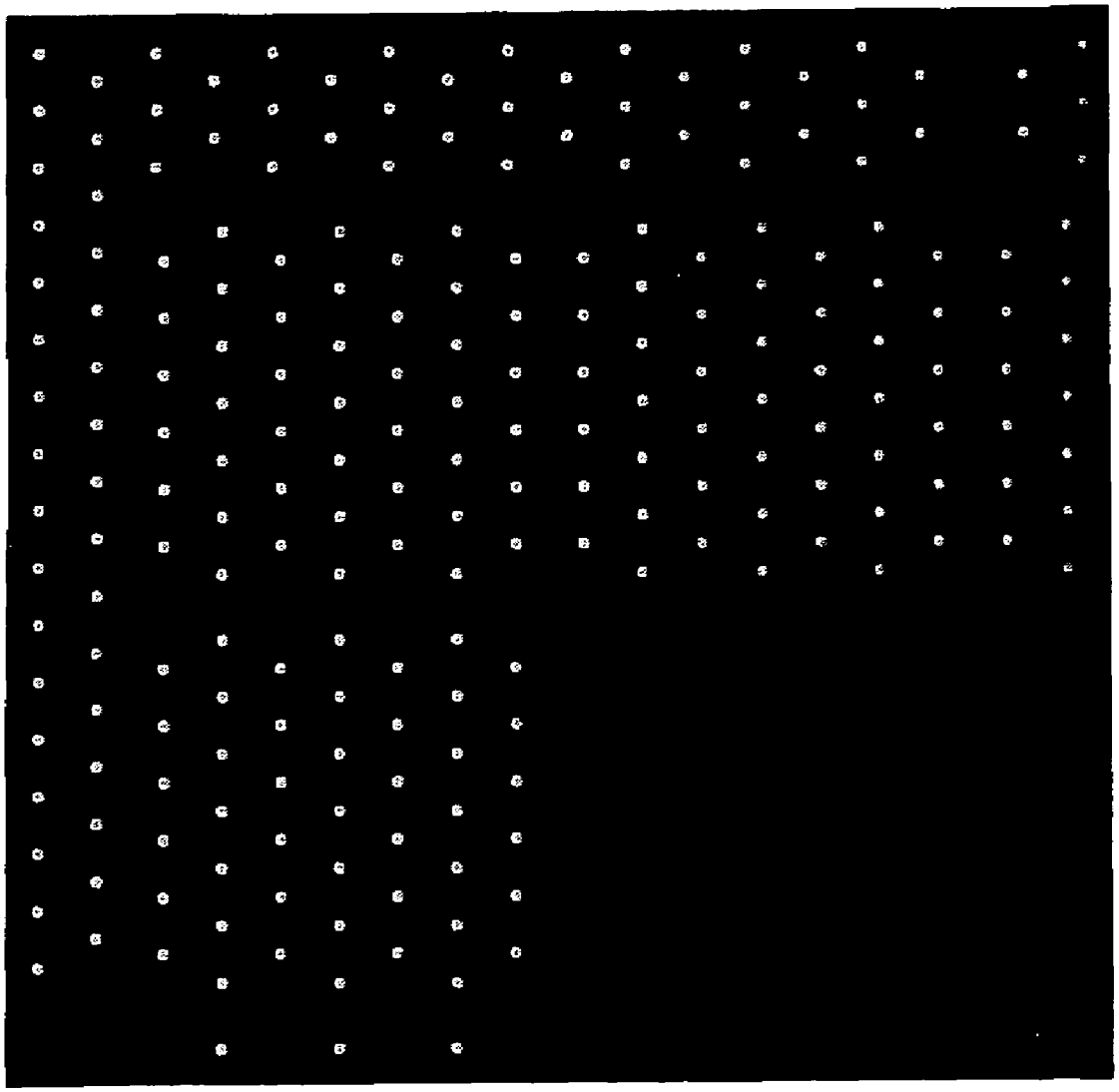
FIG. 8 shows a pattern of dots resulting from execution of image correction processing in accordance with an embodiment of the invention.

To this end, conduct a search for only contact hole-like pattern components within the image being tested to thereby designate as a correction region the pattern regions and surrounding regions thereof. Then, prepare a two-value pixel map with the correction region being set at 255 (white level) while letting the remaining area be set at zero (black level), by way of example. An example of the two-value or "binary" pixel map is shown in FIG. 7. While the correction region of FIG. 7 contains an ensemble of rectangular regions, any other shapes are alternatively employable as far as these have pattern designation capabilities.

This two-value pixel map is referred to when generating the above-stated set of simultaneous equations (2) for identification of the parameter(s) of the 2D linear prediction modeling. Here, a technique is employed for precluding substitution of elements to be calculated by Equation (1) at the zero-valued (black level) coordinates in the two-value pixel map of FIG. 7. This makes it possible to obtain a sharp and crisp corrected pattern image that is exclusively dedicated to the contact-hole pattern to be inspected, such as shown in FIG. 6.

As apparent from the foregoing, according to the embodiment, it is possible to provide a high-accuracy image correction method for use in pattern inspection apparatus, such as reticle inspection apparatus, which method is capable of excluding unwanted influenceability of inspection-unnecessary zones in the pattern image of interest to thereby offer enhanced image correctability as to an inspection-executed region and its nearby areas. Although the invention has been disclosed and illustrated with reference to particular embodiments, the principles involved are susceptible for use in numerous other embodiments, modification and alterations which will be apparent to persons skilled in the art to which the invention pertains. The invention is, therefore, to be limited only as indicated by the scope of the appended claims.

What is claimed is:

1. A device for correcting a pattern image by use of an inspection reference pattern image of a workpiece being tested and a pattern image under test, said device comprising:
    a correction region designation unit operative to designate a correction region including a pattern and its nearby portion within each of the reference pattern image and the pattern image under test;
    an equation generation unit operative to generate by linear predictive modeling a set of simultaneous equations for a reference pattern image within the correction region and an under-test pattern image within the correction region;
    a parameter generation unit operative to solve the equations to thereby obtain a model parameter; and
    a corrected pattern image generation unit operative to use the model parameter to apply the linear predictive modeling to the reference pattern image to thereby generate a corrected pattern image.

2. The device according to claim 1, wherein said correction pattern image generation unit uses a two-value pixel map for designation of the correction region, and wherein said equation generation unit refers to the two-value pixel map for generation of the equations.

3. The device according to claim 1, wherein the correction region contains therein a contact hole as a pattern to be designated.

4. The device according to claim 1, wherein the linear predictive modeling is a two-dimensional ("2D") predictive modeling with each pixel of the under-test pattern image as a 2D output data and with a linear coupling of a group of pixels around a single pixel of the reference pattern image corresponding to said each pixel as a 2D input data.

5. The device according to claim 1, wherein the linear predictive modeling is a 2D predictive modeling with each pixel of the under-test pattern image as a 2D output data while letting a linear coupling of a matrix of five rows and five columns of pixels having a centrally placed pixel of the reference pattern image corresponding to said each pixel be a 2D input data.

6. An apparatus for performing pattern inspection by using an inspection reference pattern image of a workpiece being tested and a pattern image under test, said apparatus comprising:
    a correction region designation unit operative to designate a correction region including a pattern and its nearby portion within each of the reference pattern image and the pattern image under test;
    an equation generation unit operative to generate by linear predictive modeling a set of simultaneous equations for a reference pattern image within the correction region and an under-test pattern image within the correction region;
    a parameter generation unit operative to solve the equations to thereby obtain a model parameter;
    a corrected pattern image generation unit operative to use the model parameter to apply the linear predictive modeling to the reference pattern image to thereby generate a corrected pattern image; and
    a pattern image comparison unit operative to compare the corrected pattern image to the test pattern image in the correction region for detecting defects of the test pattern image.

7. A method for correcting a pattern image by use of an inspection reference pattern image of a workpiece being tested and a pattern image under test carried out by an image correction device, said method comprising:

designating a correction region including a pattern and its nearby portion within each of the reference pattern image and the pattern image under test by the image correction device;

generating by linear predictive modeling a set of simultaneous equations for a reference pattern image within the correction region and an under-test pattern image within the correction region by the image correction device;

solving the equations to thereby obtain a model parameter by the image correction device; and using the model parameter to apply the linear predictive modeling to the reference pattern image to thereby generate a corrected pattern image by the image correction device.

8. A method for performing pattern inspection by using an inspection reference pattern image of a workpiece being tested and a pattern image under test carried out by a pattern inspection apparatus, comprising:

designating a correction region including a pattern and its nearby portion within each of the reference pattern image and the pattern image under test by the pattern inspection apparatus;

generating by linear predictive modeling a set of simultaneous equations for a reference pattern image within the correction region and an under-test pattern image within the correction region by the pattern inspection apparatus;

solving the equations to thereby obtain a model parameter by the pattern inspection apparatus;

using the model parameter to apply the linear predictive modeling to the reference pattern image to thereby generate a corrected pattern image by the pattern inspection apparatus; and comparing the corrected pattern image to the test pattern image in the correction region for detecting defects of the test pattern image by the pattern inspection apparatus.

* * * * *